(12) United States Patent
Chiu

(10) Patent No.: US 6,520,368 B1
(45) Date of Patent: Feb. 18, 2003

(54) THERMOS WITH A DETACHABLE STAND

(75) Inventor: Brian Chiu, Kaohsiung (TW)

(73) Assignee: FUU HWA Vacuum Bottle Co., Ltd., Tainan (TW)

( * ) Notice: Subject to any disclaimer, the term of this patent is extended or adjusted under 35 U.S.C. 154(b) by 0 days.

(21) Appl. No.: 10/192,062

(22) Filed: Jul. 10, 2002

(51) Int. Cl.[7] ............................................. B65D 25/24
(52) U.S. Cl. ..................... 220/630; 222/185.1; 248/146; 248/149
(58) Field of Search ........................ 220/630; 222/181.1, 222/185.1, 186; 248/146, 154, 149

(56) References Cited

U.S. PATENT DOCUMENTS

| | | | | |
|---|---|---|---|---|
| 2,949,209 A | * | 8/1960 | Schott | .......................... 220/630 |
| 4,344,645 A | * | 8/1982 | Kirk | ............................. 285/61 |
| 5,295,598 A | * | 3/1994 | Gerlach et al. | ............. 215/376 |
| 6,076,707 A | * | 6/2000 | Feldner | .................... 222/181.1 |
| 6,135,303 A | * | 10/2000 | Schultz | ........................ 215/377 |
| 6,244,459 B1 | * | 6/2001 | Bouc et al. | .................. 220/630 |

* cited by examiner

Primary Examiner—Joseph M. Moy
(74) Attorney, Agent, or Firm—Ladas & Parry

(57) ABSTRACT

A thermos includes a container detachably mounted on a stand via a coupling member that is formed with a plurality of angularly spaced apart elongated slots, each of which has an enlarged end and a reduced extension. A plurality of studs project from a top seat of the stand into the elongated slots, respectively. The container is rotatable relative to the stand between an engaging position, in which each stud anchors on the reduced extension of a respective one of the slots, and a disengaging position, in which each stud is aligned with the enlarged end of the respective one of the slots.

3 Claims, 6 Drawing Sheets

THERMOS WITH A DETACHABLE STAND

BACKGROUND OF THE INVENTION

1. Field of the Invention

This invention relates to a thermos with a detachable stand.

2. Description of the Related Art

FIG. 1 illustrates a conventional thermos 1 that includes a stand 12 and a container 11 mounted on the stand 12 via screw means 13. The conventional thermos 1 is disadvantageous in that removal of the container 11 from the stand 12 requires unscrewing of the screw means 13, and thus is relatively inconvenient.

SUMMARY OF THE INVENTION

Therefore, the object of the present invention is to provide a thermos with a detachable stand that is capable of overcoming the aforesaid drawback of the prior art.

According to the present invention, a thermos comprises: an upright stand including a laterally extending top seat and a plurality of angularly spaced apart headed studs projecting upwardly from the top seat, each of the headed studs having an enlarged head portion vertically spaced apart from the top seat; a vertically extending cylindrical container mounted detachably and rotatably on the top seat of the stand and having a laterally extending bottom wall with a peripheral edge, an upper peripheral wall extending upwardly from the peripheral edge of the bottom wall and confining a water-receiving space, a lower peripheral wall extending downwardly from the peripheral edge of the bottom wall and confining a mounting space, an annular bottom flange laterally extending from the lower peripheral wall into the mounting space and formed with an engaging hole, and an outlet tube extending downwardly and outwardly of the mounting space from the bottom wall through the lower peripheral wall, and in fluid communication with the water-receiving space, the container being rotatable relative to the stand between engaging and disengaging positions; a coupling member mounted in the mounting space and having a laterally extending annular flange part that is surrounded by the bottom flange, that is disposed over the top seat of the stand, and that is formed with a plurality of angularly spaced apart elongated slots, each of which has an enlarged end and a reduced extension that is reduced and that extends from the enlarged end, the head portion of each of the headed studs having a cross-section which is smaller than that of the enlarged end of a respective one of the slots and greater than the width of the reduced extension of the respective one of the slots, each of the headed studs extending through the respective one of the slots and movable along the respective one of the slots in such a manner that the head portion of each of the headed studs anchors on a periphery of the reduced extension of the respective one of the slots when the container is positioned at the engaging position, thereby preventing removal of the container from the stand, and that the head portion of each of the headed studs is vertically aligned with the enlarged end of the respective one of the slots when the container is positioned at the disengaging position, thereby permitting removal of the container from the stand; and a spring-biased latch that is mounted movably on the top seat and that is operable to move upwardly and downwardly between a limiting position, in which the spring-biased latch moves upwardly to project into the engaging hole in the bottom flange of the container when the container is positioned at the engaging position, thereby preventing angular movement of the container relative to the stand, and a non-limiting position, in which the spring-biased latch moves downwardly to disengage from the engaging hole, thereby permitting angular movement of the container relative to the stand.

BRIEF DESCRIPTION OF THE DRAWINGS

In drawings which illustrate an embodiment of the invention.

DETAILED DESCRIPTION OF THE PREFERRED EMBODIMENT

Figure 1:
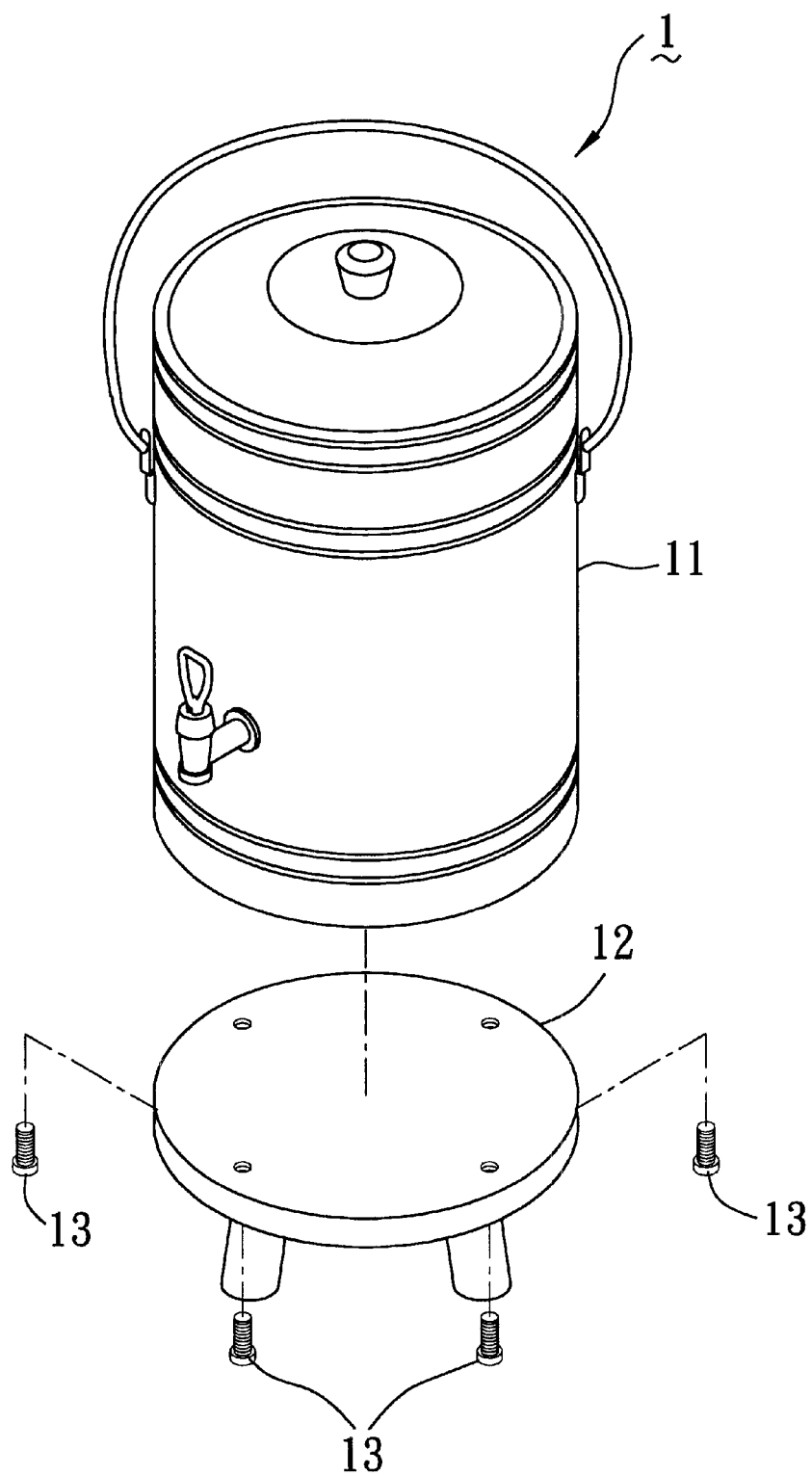
FIG. 1 is an exploded perspective view of a conventional thermos.
Figure 2:
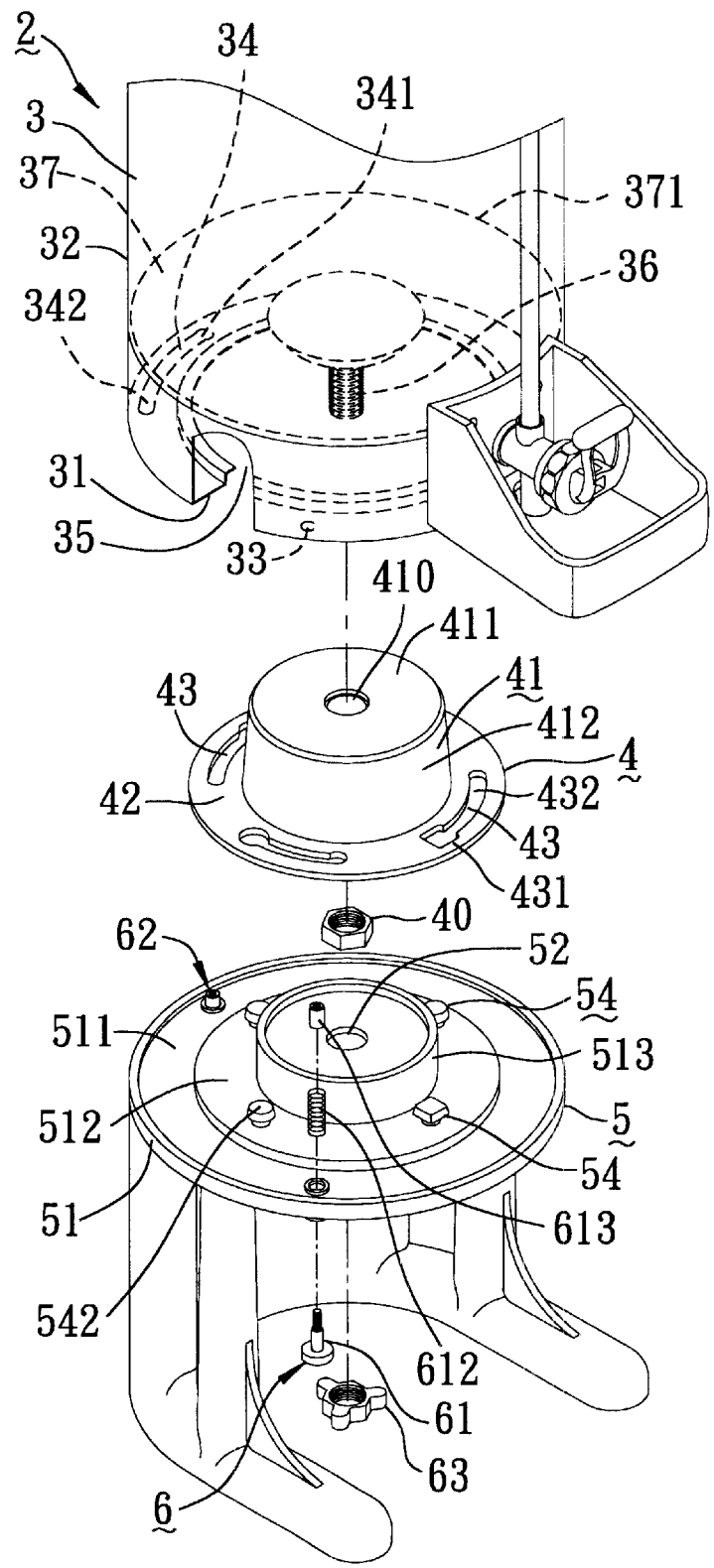
FIG. 2 is a fragmentary exploded perspective view of a thermos embodying this invention.
Figure 3:
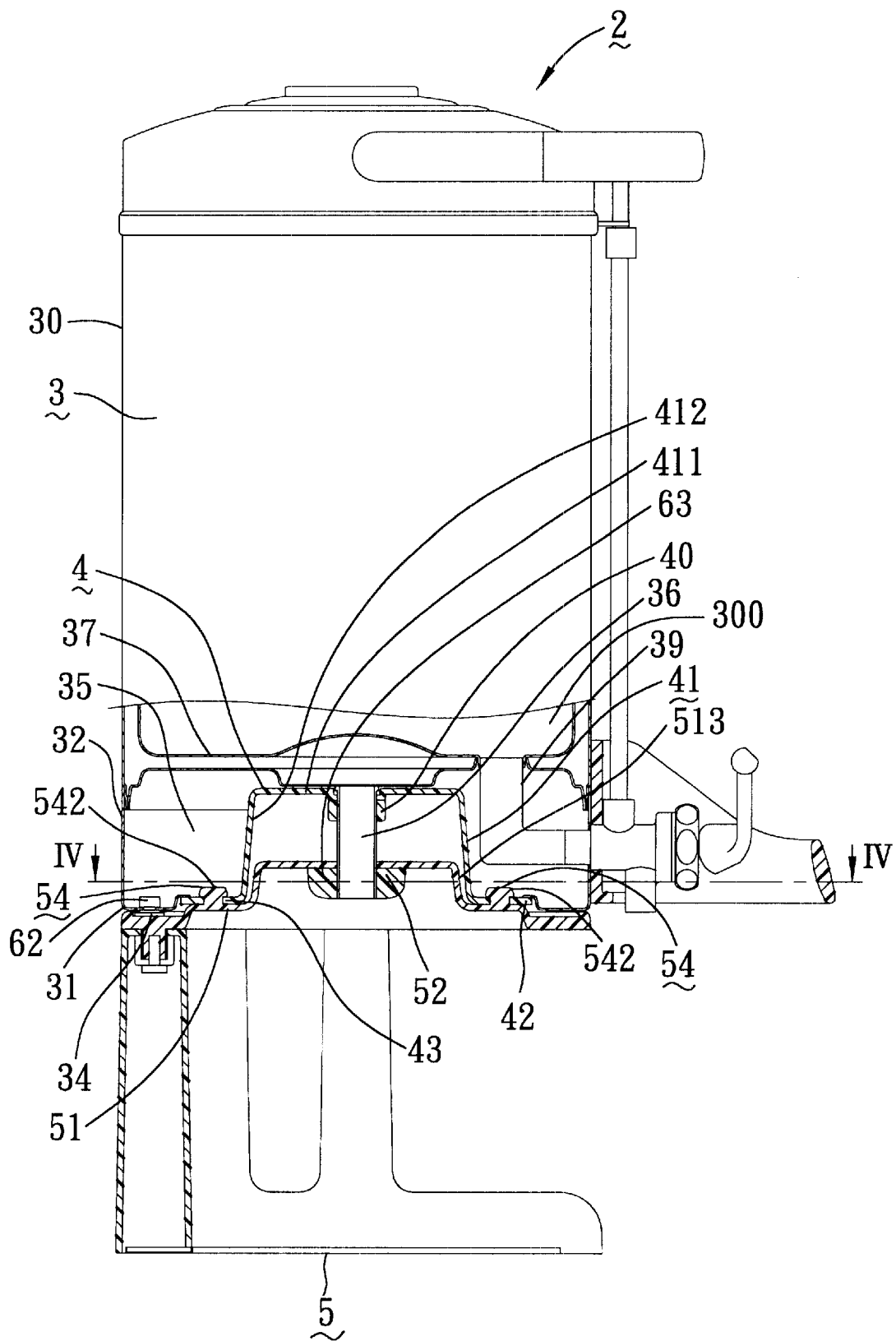
FIG. 3 is a partly sectional side view of the thermos of FIG. 2.
Figure 4:
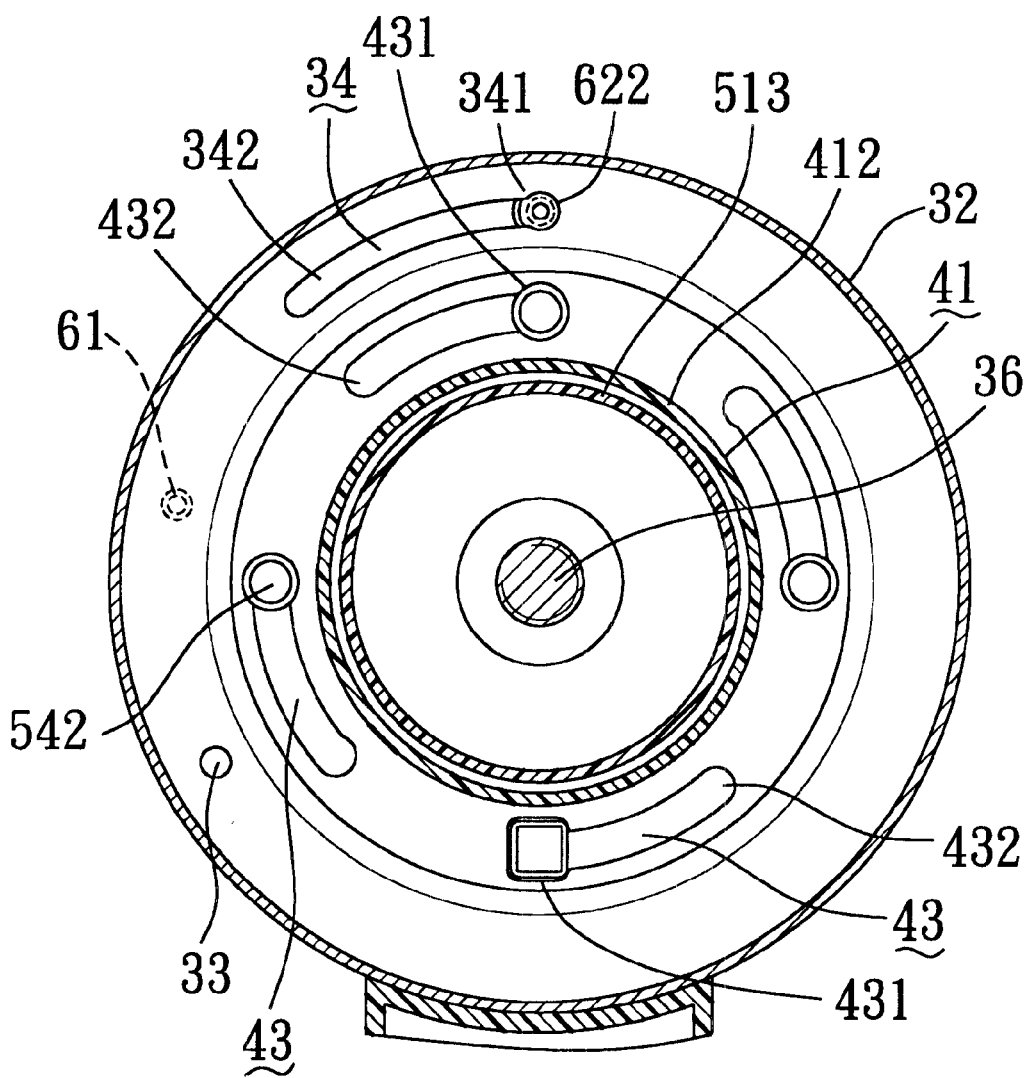
FIG. 4 is a sectional view taken from line IV—IV of FIG. 3, with a container of the thermos of FIG. 2 positioned at a disengaging position.
Figure 5:
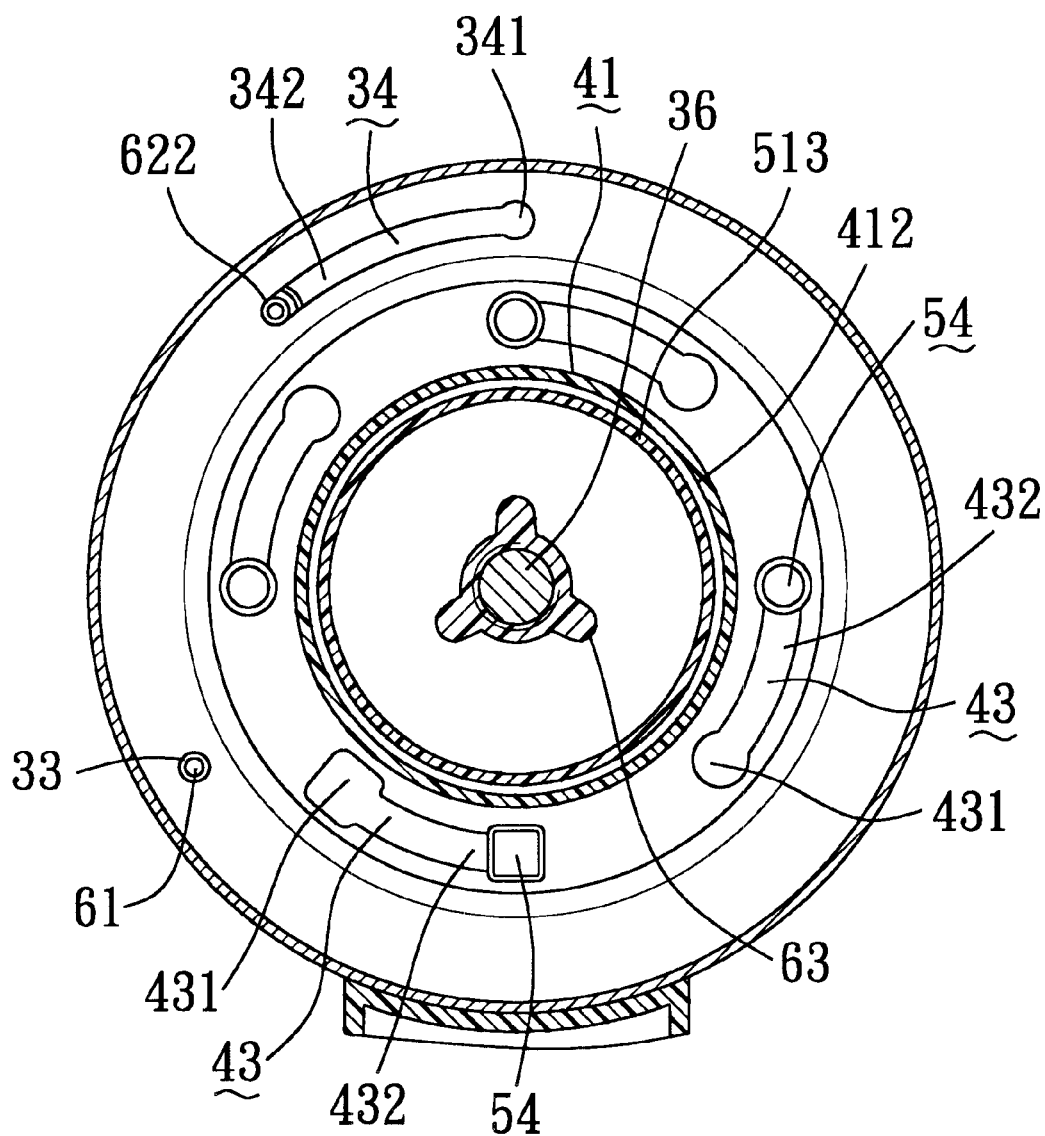
FIG. 5 is a sectional view similar to that of FIG. 4, except that the container is positioned at an engaging position.
Figure 6:
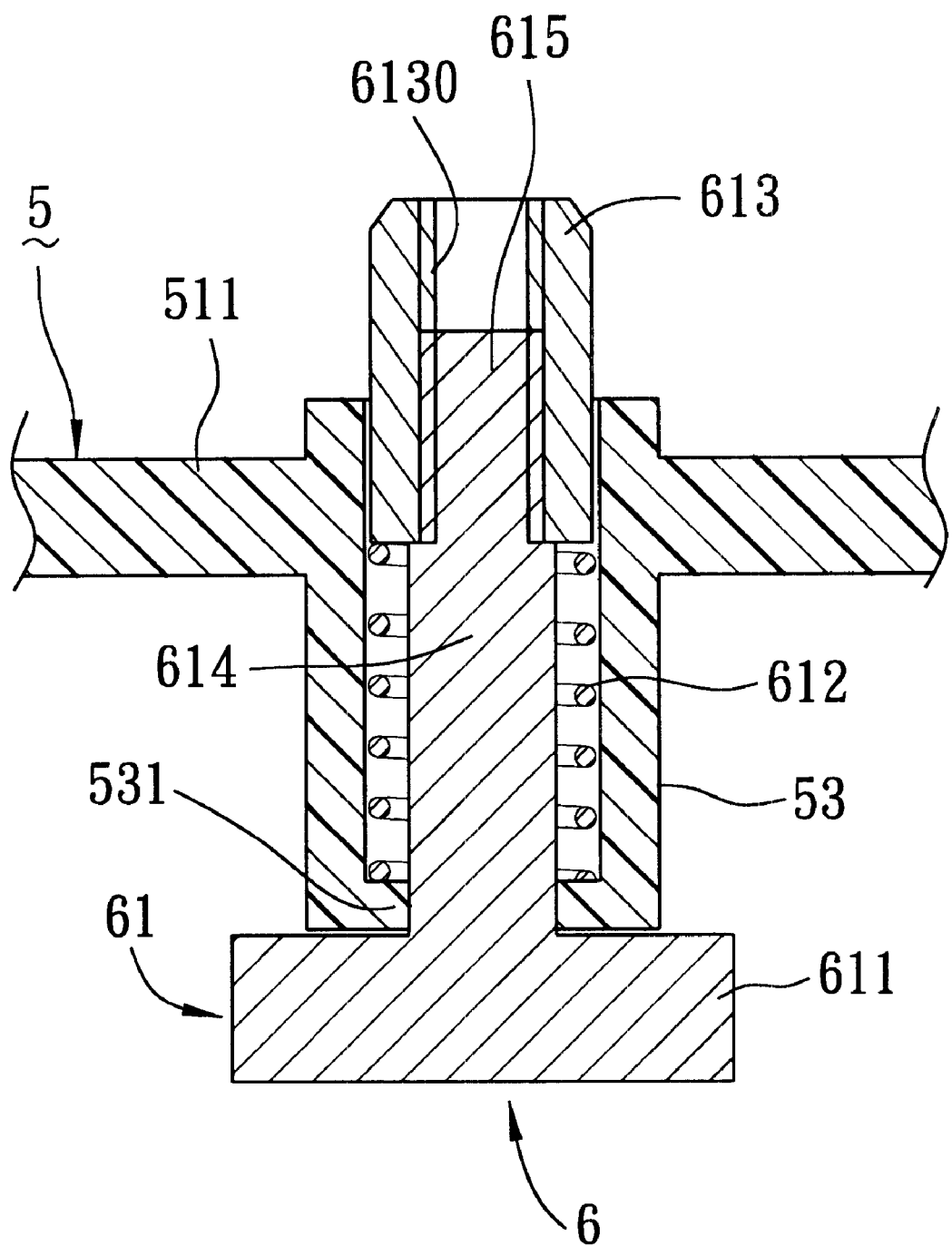
FIG. 6 is a fragmentary sectional view of a spring-biased latch of the thermos of FIG. 2.

FIGS. 2 to 6 illustrate a preferred embodiment of a thermos 2 of this invention. The thermos 2 includes: an upright stand 5 including a laterally extending top seat 51 and a plurality of angularly spaced apart headed studs 54 projecting upwardly from the top seat 51, each of the headed studs 54 having an enlarged head portion 542 vertically spaced apart from the top seat 51; a vertically extending cylindrical container 3 mounted detachably and rotatably on the top seat 51 of the stand 5 and having a laterally extending bottom wall 37 with a peripheral edge 371, an upper peripheral wall 30 extending upwardly from the peripheral edge 371 of the bottom wall 37 and confining a water-receiving space 300, a lower peripheral wall 32 extending downwardly from the peripheral edge 371 of the bottom wall 37 and confining a mounting space 35, an annular bottom flange 31 laterally extending from the lower peripheral wall 32 into the mounting space 35 and formed with an engaging hole 33, and an outlet tube 39 extending downwardly and outwardly of the mounting space 35 from the bottom wall 37 through the lower peripheral wall 32, and in fluid communication with the water-receiving space 300, the container 3 being rotatable relative to the stand 5 between engaging and disengaging positions; a coupling member 4 mounted in the mounting space 35 and having a laterally extending annular flange part 42 that is surrounded by the bottom flange 31, that is disposed over the top seat 51 of the stand 5, and that is formed with a plurality of angularly spaced apart elongated slots 43, each of which has an enlarged end 431 and a reduced extension 432 that is reduced and that extends from the enlarged end 431, the head portion 542 of each of the headed studs 54 having a cross-section which is smaller than that of the enlarged end 431 of a respective one of the slots 43 and greater than the width of the reduced extension 432 of the respective one of the slots 43, each of the headed studs 54 extending through the respective one of the slots 43 and movable along the respective one of the slots 43 in such a manner that the head portion 542 of each of the headed studs 54 anchors on a periphery of the reduced extension 432 of the respective one of the slots 43 when the container 3 is positioned at the engaging position (see FIG. 5), thereby preventing removal of the container 3 from the stand 5, and that the head portion 542 of each of the headed studs 54 is vertically aligned with the enlarged end 431 of the respective one of the slots 43 when the container 3 is positioned at the disengaging position (see FIG. 4), thereby permitting removal of the container 3 from the stand 5; and a spring-biased latch 6 that is mounted movably on the top seat 51 and that is operable to move upwardly and downwardly between a limiting position, in which, the spring-biased latch 6 moves upwardly to project into the engaging hole 33 in the bottom flange 31 of the container 3 when the container 3 is positioned at the engaging position (see FIG. 5), thereby preventing angular movement of the container 3 relative to the stand 5, and a non-limiting position, in which the spring-biased latch 6 moves downwardly to disengage from the engaging hole 33, thereby permitting angular movement of the container 3 relative to the stand 5 (see FIG. 4).

The bottom flange 31 of the container 3 is further formed with an elongated auxiliary slot 34 that has an enlarged end 341 and a reduced extension 3342 which is reduced and which extends from the enlarged end 341 of the auxiliary slot 34. The stand 5 further includes an auxiliary headed stud 62 that has a head portion 622 vertically spaced apart from the top seat 51 and having a cross-section smaller than that of the enlarged end 341 of the auxiliary slot 34 and greater than the width of the reduced extension 342 of the auxiliary slot 34. The auxiliary headed stud 62 projects upwardly from the top seat 51 through the auxiliary slot 34, and is movable along the auxiliary slot 34 in such a manner that the head portion 622 of the auxiliary headed stud 62 anchors on a periphery of the reduced extension 342 of the auxiliary slot 34 when the container 3 is positioned at the engaging position, and that the head portion 622 of the auxiliary headed stud 62 is vertically aligned with the enlarged end 341 of the auxiliary slot 34 when the container 3 is positioned at the disengaging position.

A screw rod 36 extends downwardly from the bottom wall 37, and defines an axis. First and second screw nuts 40, 63 are threadedly engageable with the first screw rod 36. The container 3 is rotatable about the axis. The coupling member 4 further has a cap-shaped part 41 that has a laterally extending top wall 411 and a peripheral wall 412 extending downwardly from the top wall 411 and having a bottom end opposite to the top wall 411. The annular flange part 42 extends radially and outwardly from the bottom end of the peripheral wall 412 of the cap-shaped part 41. The top wall 411 is formed with a through-hole 410 for extension of the screw rod 36 therethrough, is disposed between the first screw nut 40 and the bottom wall 37 of the container 3, and is abuttable against the bottom wall 37 of the container 3 by tightening of the first screw nut 40 on the screw rod 36 against the top wall 411. The top seat 51 of the stand 5 is terraced, and has an annular lower terrace 511, an annular intermediate terrace 512 extending inwardly and upwardly from the lower terrace 511, and an annular upper terrace 513 extending inwardly and upwardly from the intermediate terrace 512 and projecting into the cap-shaped part 41. The upper terrace 513 is formed with a through-hole 52 for extension of the screw rod 36 therethrough. The headed studs 54 project upwardly from the intermediate terrace 512. The intermediate terrace 512 is abuttable against the annular flange part 42 of the coupling member 4 by tightening of the second screw nut 63 on the screw rod 36 against the intermediate terrace 512, thereby securing the container 3 to the top seat 51 of the stand 5. The top seat 51 further has a tubular spring-retaining part 53 that extends downwardly from the lower terrace 511 and that has a laterally extending bottom wall 531. The spring-biased latch 6 includes a coil spring 612 disposed in the spring-retaining part 53, and an inverted bolt 61 that has an enlarged bottom end 611 disposed below the bottom wall 531 of the spring-retaining part 53, and a stem portion 614 reduced from the enlarged bottom end 611 and extending through the bottom wall 531 of the spring-retaining part 53 and into the spring-retaining part 53 and having an upper threaded end 615. The coil spring 612 is sleeved around the stem portion 614. The spring-biased latch 6 further includes a tubular engaging part 613 that has an inner threaded wall 6130 threadedly engaging the upper threaded end 615 of the stem portion 614. The coil spring 612 has two opposite ends abutting against the inner threaded wall 6130 of the engaging part 613 and the bottom wall 531 of the spring-retaining part 53, respectively, so as to urge the engaging part 613 to move upwardly into the engaging hole 33, thereby positioning the spring-biased latch 6 at the limiting position when the container 3 is positioned at the engaging position. The enlarged bottom end 611 of the inverted bolt 61 is operable in such a manner that pulling of the enlarged bottom end 611 of the inverted bolt 61 results in downward movement of the engaging part 613 against the urging force of the coil spring 612 to disengage from the engaging hole 33, thereby positioning the spring-biased latch 6 at the non-limiting position.

Since removal of the container 3 from the stand 5 is carried out by loosening the second screw nut 63 and subsequently pulling down the inverted bolt 61 to disengage the engaging part 613 from the engaging hole 33 so as to permit angular movement of the container 3 from the engaging position to the disengaging position, the aforesaid drawback associated with the prior art can be eliminated.

With the invention thus explained, it is apparent that various modifications and variations can be made without departing from the spirit of the present invention. It is therefore intended that the invention be limited only as recited in the appended claims.

I claim:
1. A thermos comprising:
   an upright stand including a laterally extending top seat and a plurality of angularly spaced apart headed studs projecting upwardly from said top seat, each of said headed studs having an enlarged head portion vertically spaced apart from said top seat;
   a vertically extending cylindrical container mounted detachably and rotatably on said top seat of said stand and having a laterally extending bottom wall with a peripheral edge, an upper peripheral wall extending upwardly from said peripheral edge of said bottom wall and confining a water-receiving space, a lower peripheral wall extending downwardly from said peripheral edge of said bottom wall and confining a mounting space, an annular bottom flange laterally extending from said lower peripheral wall into said mounting space and formed with an engaging hole, and an outlet tube extending downwardly and outwardly of said mounting space from said bottom wall through said lower peripheral wall, and in fluid communication with said water-receiving space, said container being rotatable relative to said stand between engaging and disengaging positions;
   a coupling member mounted in said mounting space and having a laterally extending annular flange part that is surrounded by said bottom flange, that is disposed over said top seat of said stand, and that is formed with a plurality of angularly spaced apart elongated slots, each of which has an enlarged end and a reduced extension that is reduced and that extends from said enlarged end, said head portion of each of said headed studs having a cross-section which is smaller than that of said enlarged end of a respective one of said slots and greater than width of said reduced extension of the respective one of said slots, each of said headed studs extending through the respective one of said slots and movable along the respective one of said slots in such a manner that said head portion of each of said headed studs anchors on a periphery of said reduced extension of the respective one of said slots when said container is positioned at said engaging position, thereby preventing removal of said container from said stand, and that said head portion of each of said headed studs is vertically aligned with said enlarged end of the respective one of said slots when said container is positioned at said disengaging position, thereby permitting removal of said container from said stand; and a spring-biased latch that is mounted movably on said top seat and that is operable to move upwardly and downwardly between a limiting position, in which, said spring-biased latch moves upwardly to project into said engaging hole in said bottom flange of said container when said container is positioned at said engaging position, thereby preventing angular movement of said container relative to said stand, and a non-limiting position, in which said spring-biased latch moves downwardly to disengage from said engaging hole, thereby permitting angular movement of said container relative to said stand.

2. The thermos of claim 1, wherein said bottom flange of said container is further formed with an elongated auxiliary slot that has an enlarged end and a reduced extension which is reduced and which extends from said enlarged end of said auxiliary slot, said stand further including an auxiliary headed stud that has a head portion vertically spaced apart from said top seat and having a cross-section smaller than that of said enlarged end of said auxiliary slot and greater than width of said reduced extension of said auxiliary slot, said auxiliary headed stud projecting upwardly from said top seat through said auxiliary slot and movable along said auxiliary slot in such a manner that said head portion of said auxiliary headed stud anchors on a periphery of said reduced extension of said auxiliary slot when said container is positioned at said engaging position, and that said head portion of said auxiliary headed stud is vertically aligned with said enlarged end of said auxiliary slot when said container is positioned at said disengaging position.

3. The thermos of claim 1, further comprising a screw rod extending downwardly from said bottom wall and defining an axis, and first and second screw nuts threadedly engageable with said first screw rod, said container being rotatable about said axis, said coupling member further having a cap-shaped part that has a laterally extending top wall and a peripheral wall extending downwardly from said top wall and having a bottom end opposite to said top wall, said annular flange part extending radially and outwardly from said bottom end of said peripheral wall of said cap-shaped part, said top wall being formed with a through-hole for extension of said screw rod therethrough, being disposed between said first screw nut and said bottom wall of said container, and being abuttable against said bottom wall of said container by tightening of said first screw nut on said screw rod against said top wall, said top seat of said stand being terraced and having an annular lower terrace, an annular intermediate terrace extending inwardly and upwardly from said lower terrace, and an annular upper terrace extending inwardly and upwardly from said intermediate terrace and projecting into said cap-shaped part, said upper terrace being formed with a through-hole for extension of said screw rod therethrough, said headed studs projecting upwardly from said intermediate terrace, said intermediate terrace being abuttable against said annular flange part of said coupling member by tightening of said second screw nut on said screw rod against said intermediate terrace, said top seat further having a tubular spring-retaining part that extends downwardly from said lower terrace and that has a laterally extending bottom wall, said spring-biased latch including a coil spring disposed in said spring-retaining part, and an inverted bolt that has an enlarged bottom end disposed below said bottom wall of said spring-retaining part, and a stem portion reduced from said enlarged bottom end and extending through said bottom wall of said spring-retaining part and into said spring-retaining part, and having an upper threaded end, said coil spring being sleeved around said stem portion, said spring-biased latch further including a tubular engaging part that has an inner threaded end threadedly engaging said upper threaded end of said stem portion, said coil spring having two opposite ends abutting against said inner threaded end of said engaging part and said bottom wall of said spring-retaining part, respectively, so as to urge said engaging part to move upwardly into said engaging hole, thereby positioning said spring-biased latch at the limiting position when said container is positioned at said engaging position, said enlarged bottom end of said inverted bolt being operable in such a manner that pulling of said enlarged bottom end of said inverted bolt results in downward movement of said engaging part against the urging force of said coil spring to disengage from said engaging hole, thereby positioning said spring-biased latch at the non-limiting position.

* * * * *